United States Patent [19]
Tabatabaie-Raissi et al.

[11] Patent Number: 5,604,339
[45] Date of Patent: Feb. 18, 1997

[54] METHOD OF PHOTOCATALYTIC DESTRUCTION OF HARMFUL VOLATILE COMPOUNDS AT EMITTING SURFACES

[75] Inventors: Ali Tabatabaie-Raissi; Nazim Z. Muradov, both of Melbourne; Philip W. Fairey, III, Merritt Island, all of Fla.

[73] Assignee: University of Central Florida, Orlando, Fla.

[21] Appl. No.: 403,305

[22] Filed: Mar. 14, 1995

[51] Int. Cl.⁶ ..................................................... B01D 53/00
[52] U.S. Cl. ..................... 204/157.3; 427/372.2
[58] Field of Search ....................... 427/372.2; 204/157.3

[56] References Cited

U.S. PATENT DOCUMENTS

| | | | |
|---|---|---|---|
| 3,781,194 | 12/1973 | Julillet et al. | 204/162 R |
| 4,017,652 | 4/1977 | Gruber | 427/54 |
| 4,892,712 | 1/1990 | Robertson et al. | 422/186 |
| 4,966,759 | 10/1990 | Robertson et al. | 422/186 |
| 4,996,665 | 10/1990 | Ibusuki et al. | 204/157 |
| 5,032,241 | 7/1991 | Robertson et al. | 204/157.15 |
| 5,035,784 | 7/1991 | Anderson et al. | 204/158.14 |
| 5,045,288 | 9/1991 | Raupp et al. | 422/186.3 |
| 5,246,737 | 9/1993 | Muradov | 427/307 |
| 5,326,633 | 7/1994 | Clough et al. | 428/288 |

OTHER PUBLICATIONS

Ibusuki Removal of Low Concentration Air Pollutants through Photoassisted Heterogeneous Catalysis 1993 375–435, 747–578.

Miller "Treatment of Organic Contaminants in air by Photo Oxidation" 1993 Elsevier Publishers 573–578.
Solar Letter "Curing Sick Buildings" Sep. 16, 1994 224–225 NREL and United Technologies Research Center.
Solar Letter "Disinfecting Tiles" Newsfronts Popular Science Sep. 1994 p. 1.
Solar Letter "Researchers Hope to Find Light at End of Disinfection Tunnel" The Solar Letter (Jun. 10, 1994) 138–143.

*Primary Examiner*—Christopher Raimund
*Attorney, Agent, or Firm*—Brian S. Steinberger; Law Offices of Brian S. Steinberger

[57] ABSTRACT

Methods of destroying toxic volatile air-borne toxins are disclosed. In a preferred embodiment, a piece of formaldehyde laden wood substrate such as paneling or furniture is treated with a $TiO_2$ solution to form a thin and translucent veneer on the surface. This layer acts like a membrane preventing outward transport of formaldehyde and other harmful compounds produced by weatherization and natural degradation of the substrate. In a prefered embodiment the photocatalytic destruction of formaldehyde is achieved. Other toxins destroyed include terpenes and other types of toxic volatile organic compounds(VOCs). While the prefered embodiment is applied to wood based supports such as paneling and furniture, the invention has applicability for other surfaces such as caskets and roof shingles. For example, the $TiO_2$ coating can be used on flexible paper type face masks in order to destroy air-borne toxic compounds such as formaldehyde and the like that are used in medical environments where embalming procedures using toxins such as formaldehyde are used.

12 Claims, 18 Drawing Sheets

METHOD OF PHOTOCATALYTIC DESTRUCTION OF HARMFUL VOLATILE COMPOUNDS AT EMITTING SURFACES

This invention relates to photocatalysts, and in particular to titanium dioxide $TiO_2$ and in-situ applications that are applied to the surface of woody and biopolymer based materials as a photocatalyst for inhibiting the emission of harmful toxic volatile organic compounds (VOCs) such as formaldehyde and wood borne VOCs such as α-pinene, β-pinene and limonene.

BACKGROUND AND PRIOR ART

Toxic volatile organic compounds (VOCs) such as formaldehyde are increasingly prevalent in indoor air in both residential and in industrial settings. Formaldehyde is used in manufacturing of resins, plastics, rubber, textile finishes and especially wood based products. Ureaformaldehyde and melamine-formaldehyde resins are known for the release of formaldehyde. In particular, formaldehyde is released by the offgassing from urea-formaldehyde foam that is used as insulation for homes and businesses as well as carpet paddings. Formaldehyde is also released by the offgassing from urea-formaldehyde bonded chipboard that is used in furniture manufacturing and for building materials. Other undesirable toxins emitted from wood are monoterpenes which are a natural byproduct of wood devolatilization.

Major terpenic VOCs which are the natural toxic byproducts of wood devolatilization when wood is exposed or degraded include α-pinene, β-pinene, limonene, camphene, and fenchone.

The Clean Air Act of 1990 requires minimization of discharges to the environment and limiting VOC emissions. The detoxification of hazardous compounds generated within a given medium will require an oxidative process to "burn off" the pollutant species.

A substance that can mediate oxidation of the environmental pollutants to deep oxidation by-products such as $CO_2$ and $H_2O$ would be desirable. In general, this implies the use of oxidizing agents such as ozone and hydrogen peroxide. However, these two oxidizing agents alone are not capable of total destruction of the contaminants.

Currently, the most advanced technology for the reduction of VOCs is regenerative catalytic oxidation(RCO).

Coupling light with an oxidant such as ozone $O_3$, hydrogen peroxide $H_2O_2$, titania $TiO_2$, and others referred to as advanced oxidation processes (AOPs) has been shown to accomplish deep oxidation of all carbonaceous species to $CO_2$. In heterogeneous photocatalysis, the oxidation process is aided by using photocatalysts such as $TiO_2$, zinc oxide (ZnO) and the like. For example, $TiO_2$ particles are readily activated upon exposure to near UV radiation (wavelengths below 365 nm) producing electron/hole ($e^-/h^+$) pairs on the semiconductor surface. The electrons and holes act as strong reducing and oxidizing agents that facilitate mineralization of the target organics via formation of active species such as superoxide ion radical ($O_2^{-\bullet}$), hydroxyl radical ($OH^\bullet$), and peroxyl radical ($HO_2^\bullet$) on the semiconductor surface. For example, conduction band electrons ($e^-_{CB}$) can reduce molecular oxygen to reactive radicals as follows:

$e^-_{CB}+O_2 \rightarrow O_2^{-\bullet}$ $O_2^{-\bullet}+H^+ \rightarrow HO_2^{-\bullet}$ $2\ HO_2^{-\bullet} \rightarrow O_2+H_2O_2$ $H_2O_2 \rightarrow 2\ OH^\bullet$ Table 1 depicts the relative oxidizing power of surface borne radicals compared with other commonly used oxidants. See Harris, J. C., Ozonation, In Unit Operations for Treatment of Hazardous Industrial Wastes, Noyes Data Corporation, Park Ridge, N.J., 1978. It can be seen that the oxidizing power of hydroxyl radicals is highest among all transhalogen oxidants and surpassed only by flourine. The valence band holes ($h^+_{VB}$) can also oxidize water to produce hydroxyl radicals, where the net effect can be complete oxidation or full mineralization of target organics.

$h^+_{VB}+H_2O \rightarrow H^++OH^\bullet$

TABLE 1

Relative oxidation power of oxidizing species

| Species | Oxidation potential (volts) | Relative oxidation power (based on Cl ≈ 1) |
|---|---|---|
| F | 3.06 | 2.25 |
| OH· | 2.80 | 2.05 |
| atomic oxygen | 2.42 | 1.78 |
| $O_3$ | 2.07 | 1.52 |
| $H_2O_2$ | 1.77 | 1.30 |
| $HO_2\cdot$ | 1.70 | 1.25 |
| permanganate | 1.70 | 1.25 |
| hypochlorous acid | 1.49 | 1.10 |
| Cl | 1.36 | 1.00 |

The net effect is generally complete oxidation and full mineralization of target organics. Titania-catalyzed photo-oxidation processes combine light-assisted interactions of both homogeneous and heterogeneous nature. In addition, the combination of photons and the semiconductor photocatalyst results in new reaction pathways (i.e. photoreduction of oxygen by conduction band electrons and photooxidation by valence band holes) unavailable in non-catalytic photolysis. Reactive species (e.g. superoxide anion and hydroxyl radicals, etc.) are produced photolytically on the surface of the catalyst in the presence of water vapor and/or oxygen molecules eliminating the need for addition of active oxidants such as ozone and hydrogen peroxide. Also, the catalytically active surfaces that exist on titania influence the photodegradation kinetics and the extent of conversion of the target organic molecules. These factors combine to produce many opportunities and process flexibility to affect conversion efficiencies as well as the selectivities of the photocatalytic process. Unlike thermocatalytic processes, the photocatalytic process actually benefits from high moisture content of the media within which toxins reside as the hole oxidation of water generates highly reactive $OH^\bullet$ species that attack target organics.

Thus, the need exists to develop a more effective process for the detoxification of manufactured and wood borne toxic emissions such as formaldehyde and terpenes.

SUMMARY OF THE INVENTION

The first objective of the present invention is to provide a photocatalyst material to act as a chemical membrane that mineralizes and neutralizes organic toxins released from the product material.

The second object of this invention is to provide a chemical membrane application for wood support materials that will neutralize the emission of formaldehyde and terpenic emissions from the wood based materials.

The third object of this invention is to provide a $TiO_2$ (titania) based surface treatment, that acts as a photocatalyst for inhibiting the emission of harmful volatile organic compounds (VOCs) from a support material.

The fourth object of this invention is to provide a $TiO_2$ treatment that acts as a photocatalyst for inhibiting the emission of formaldehyde and terpenic emissions from the wood support materials.

The fifth object of this invention is to provide a chemical membrane application for wood support materials that will neutralize the emission of formaldehyde and terpenic emissions from the wood support materials.

The sixth object of this invention is to provide a titania treatment for the surface of wood that can both protect the polymeric surface and inhibit the emission of hazardous compounds.

The seventh object of this invention is to provide a titania treatment for wood surfaces that acts as a trap for absorbing toxins in indoor air and neutralizing them.

The eighth object of this invention is to provide a titania treated face mask that acts as a trap for absorbing toxins in indoor air and neutralizing them.

A preferred method includes steps of applying titania to wood, fabric and celluosic fiber surfaces. The first step applies a $TiO_2$ membrane to the sample to achieve the destruction of toxic VOCs such as but not limited to formaldehyde. Titania such as Deguss P25™, is mixed with water to make a uniform suspension (ratio $TiO_2$ to water=1:5–10 by weight). The second step is to clean (i.e. degrease) the surface to which catalyst will be applied by using a suitable solvent such as acetone, ethanol and the like. The third step is to dry the surface at room temperature to remove solvents. The fourth step is to uniformly spray the aqueous titania suspension over the woody surface to achieve loading density of approximately 1 to 2 $g/m^2$. Alternatively, a thickness of approximately 0.6–1.2 micrometer is used for a dry condition. The fifth step is to dry the surface at approximately room temperature or an ambient temperature of approximately 25° to 30° C. The sixth step is to pass the coated surface along with an acrylic or silicone film through a press roller to finalize fixation of the catalyst to the surface. Alternatively, other membranes that are also UV transparent and permeable, and the like can be used in place of silicone film. The treatment can be applied to commercially produced wood surfaces such as but not limited to panelling, fabric coated furniture and caskets. The treatment can also be applied to face mask to protect wearers from toxic VOCs.

Further objects and advantages of this invention will be apparent from the following detailed description of a presently preferred embodiment which is illustrated schematically in the accompanying drawings.

DESCRIPTION OF THE PREFERRED EMBODIMENT

Figure 1A:
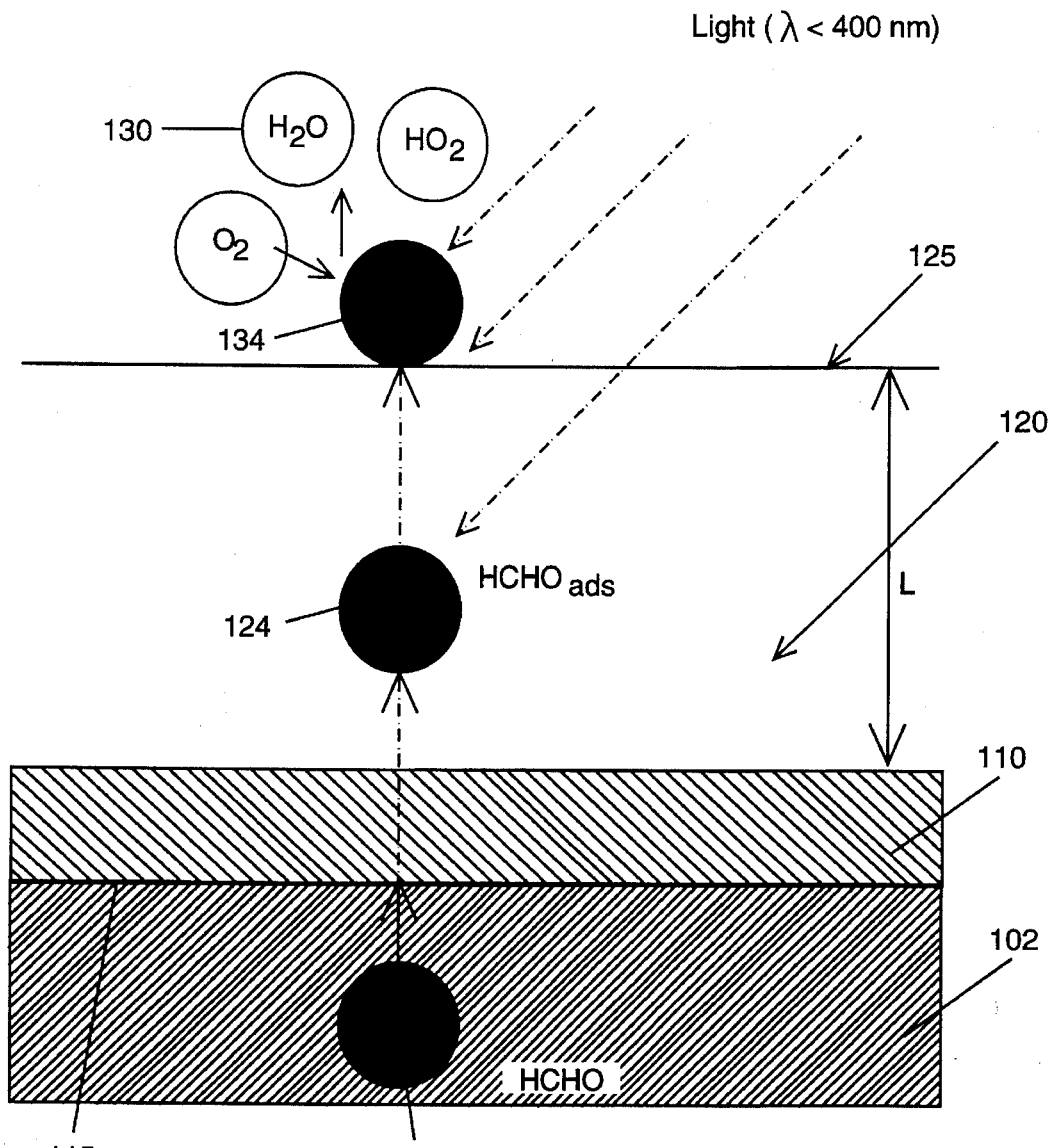
FIG. 1 illustrates formaldehyde destruction utilizing application of the subject invention.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

The subject invention applies a novel use of the process described in U.S. Pat. No. 5,246,737 by one of the subject inventors thereof, which is incorporated by reference. Patent '737 describes three steps used as a methods of immobilizing semiconductors and noble metals on a wide range of solid surfaces. In step A of the method to immobilize a semiconductor on a support made of polymeric material such as fabric or plexiglass support, a selected polymeric surface of the support is treated with an appropriate solvent. In step B, a fine (less than approximately one micron particle size) semiconductor powder slurry in the same solvent is then applied to the selected polymeric surface. In step C, the solvent is then removed by drying the polymeric surface with room temperature air. As used herein, treating the support surface means applying a selected solvent which not only cleans but causes the outer layer to swell and be capable of binding fine particles by molecular entanglement, i.e., by wrapping around the fine particles with polymer molecules. Thus, the solvent for the first step is capable of partially or entirely dissolving the support material or other auxiliary material, e.g., silicone polymer, if support is not soluble. When non-soluble natural or synthetic polymers are employed as the support or other non-soluble materials are used as the support, then the method includes the following step B' which is substituted for step B. In step B', a thin layer of approximately 1 to 100 microns of semiconductor slurry in a solvent containing an appropriate polymer, preferably silicone polymer, is applied to the already treated support surface.

U.S. Pat. No. 5,246,737 further describes that the above method can also be employed to immobilize a semiconductor catalyst such as $TiO_2$ on a fabric. More specifically, 5 g of silicone, such as silicone rings for example, are exposed to 50 ml of methylene chloride solvent solution in a 200 ml flask for approximately twenty-four hours at room temperature. Solvent containing a relatively small amount of silicone polymer (approximately 0.2 g) is drained out of the flask and is added to 1 g of $TiO_2$ (Degussa P-25™) to form a slurry. The slurry is applied onto a selected surface of a 30 cm by 30 cm piece of cotton fabric by using a soft brush as an applicator. The fabric is then dried at room temperature and pressure for approximately six hours. The fabric is then washed to remove loose $TiO_2$ particles. The washed fabric is then dried overnight (for five to ten hours). After implementing the above described steps of the immobilization method of the invention described in Patent '737, the $TiO_2$ catalyst was found to be immobilized on the fabric surface. The catalyst loading density on the fabric was found to be approximately 0.45 mg/cm² in this instance.

FIG. 1 illustrates formaldehyde destruction that uses $TiO_2$ in the subject invention. $TiO_2$ slurry is prepared and applied to the surface of the substrate 102 in the manner described in U.S. Pat. No. 5,246,737. Referring to FIG. 1 in the subject invention, substrate 102 can be a woody material. Alternatively, substrate 102 can be another biopolymeric substance. Still alternatively, substrate 102 can be a manufactured component such as but not limited to particle board, furniture, wall panel, siding and the like. The $TiO_2$ layer has a thickness of approximately 5 microns and consists of two distinct layers 110 and 120. Layer 110 is a dark layer where no light rays of a wavelength shorter than approximately 400 nm can penetrate. Layer 120 of depth L is lit by incoming light of wavelength shorter than approximately 400 nm. It is important that one chooses a photocatalysts deposition thickness in order that no catalysts activation as a result of UV light penetration occurs adjacent to the substrate-$TiO_2$ interface 115 resulting in support 102 degradation/damage.

The manner in which layers 110 and 120 work together to accomplish deep mineralization of the harmful molecules 104 released from the substrate 102 will now be discussed. Formaldehyde and other potentially harmful VOCs such as α-pinene, β-pinene, limonene, camphene, and fenchone are emitted into the dark layer of titania, 110. Some of the VOCs are trapped and the rest journey outward into the lit layer 120 where they will react with the active radical species formed there such as hydroxyl, peroxyl and superoxide ion radicals. Product of free radical attack 134 ($H_2O$, $CO_2$ and the like) diffuse out into the ambient from the surface 125. Moisture and oxygen, 130 are needed for the formation of the active oxidizing species within the lit layer 120 which readily diffuse inward from ambient into the titania layer 120.

The chemical interaction occuring in FIG. 1 are detailed in mechanisms 1–5 as follows:

1. $TiO_2 + h\nu \rightarrow e^-(TiO_2) + h^+(TiO_2)$
2. $e^+ + (O_2)_{ads} \rightarrow O_2^{-\bullet}$
3. $h^+ + (OH^-)_{surf} \rightarrow OH^\bullet$
4. $OH^\bullet + HCHO \rightarrow {}^\bullet CHO + H_2O$,
5. $CHO^\bullet + O_x \rightarrow IP\ CO_2 + H_2O$, Mechanism 1 is the charge separation or a result of a photon absorbed on the $TiO_2$ surface. Mechanism 2 refers to the superoxide ion radical generated. Mechanism 3 refers to the hydroxyl radical generated from hydroxyl ion on $TiO_2$ surface by action of holes. Mechanism 4 refers to the mechanism of hydroxyl radical attack to break formaldehyde absorbed on $TiO_2$ surface to form formyl radical. Mechanism 5 refers to the formyl radical oxidation by oxidizing species $O_x$ such as $OH^\bullet$. Intermediate oxidation products, IP, such as formic acid are formed and finally convert to the products of deep oxidation $CO_2$ and $H_2O$.

Figure 2A:
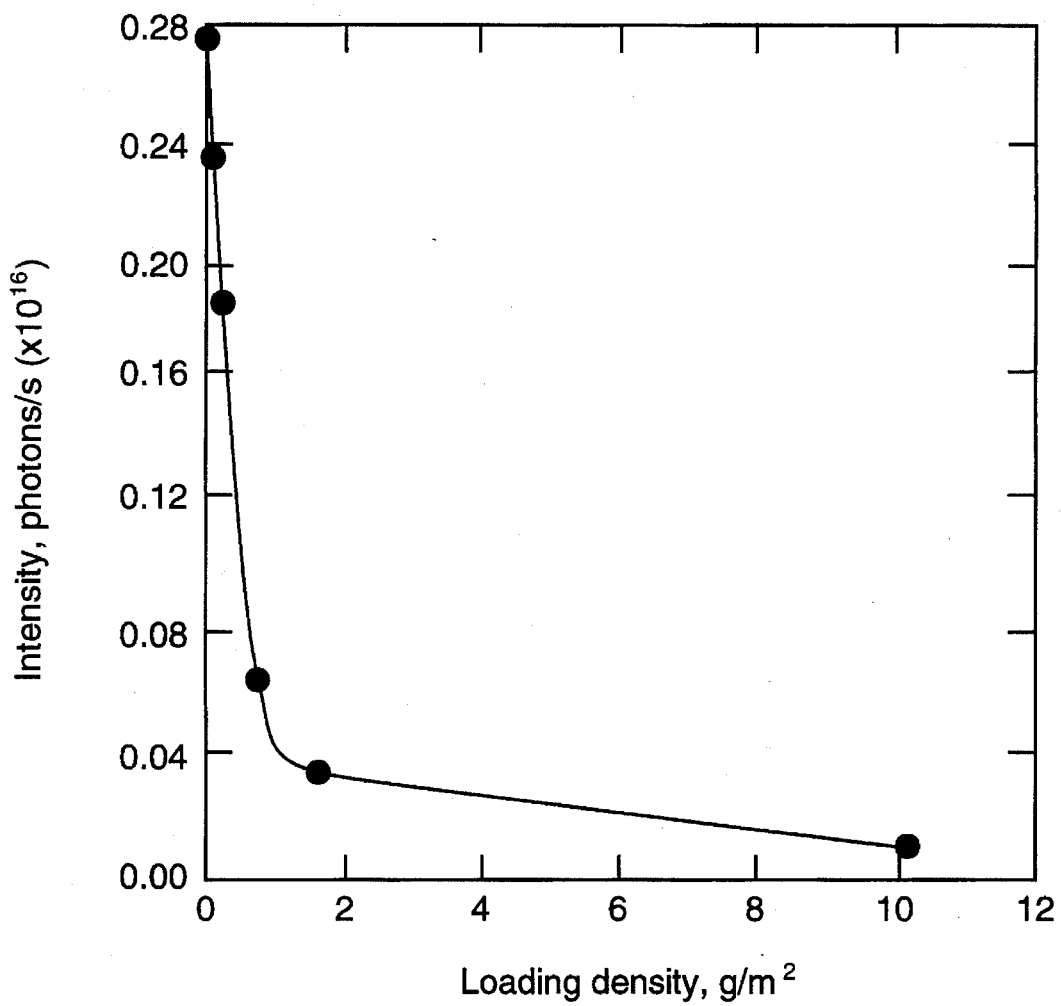
FIG. 2A is a graph of the light intensity measured past titania coating on the surface of the support in photons per second(s) verses loading density of photocatalyst ($TiO_2$) in $g/m^2$.

FIG. 2A is a graph of the light intensity measured past titanium coating on the surface of the support in photons per second verses loading density of photocatalyst ($TiO_2$) in g/cm². FIG. 2A shows that no more than a $TiO_2$ membrane (veneer) thickness for depositing on the substrate surface of no more than 2 g of $TiO_2$ per square meter of substrate is necessary. This corresponds to a film thickness of approximately 1 to 4.5 microns.

Figure 2B:
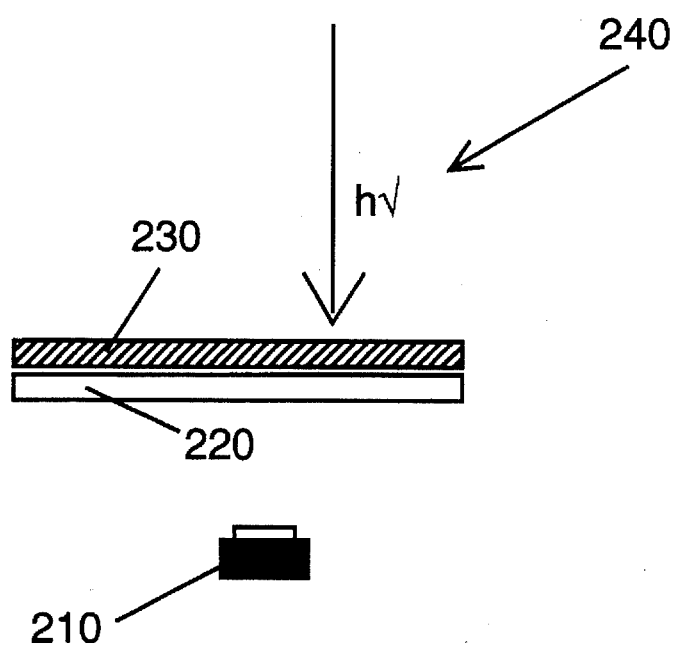
FIG. 2B is a schematic diagram of titania film transmissivity measurement.

FIG. 2B shows the setup used for finding optimum $TiO_2$ thickness (deposition depth) on the substrate. Photo multiplier 210 is placed beneath quartz plate 220 upon which various $TiO_2$ loadings (thicknesses) 230 are deposited. UV light 240 is partially absorbed by $TiO_2$ layer as it passes through to reach photo multiplier 210.

Figure 3A:
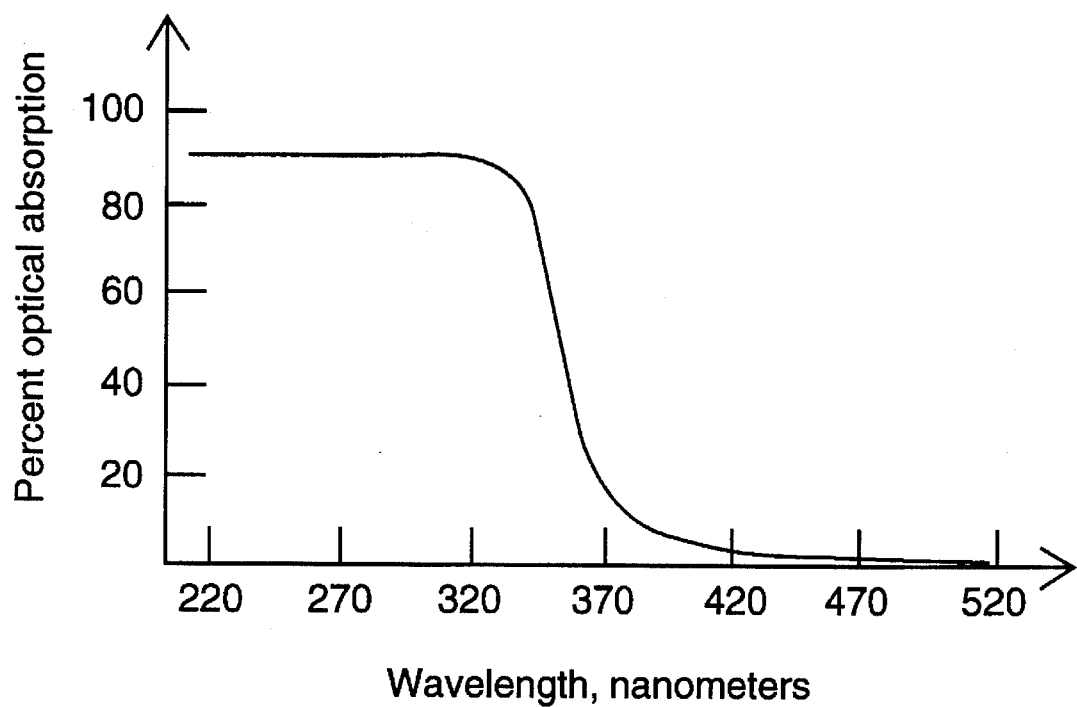
FIG. 3A is the absorption spectra of anatase $TiO_2$.
Figure 3B:
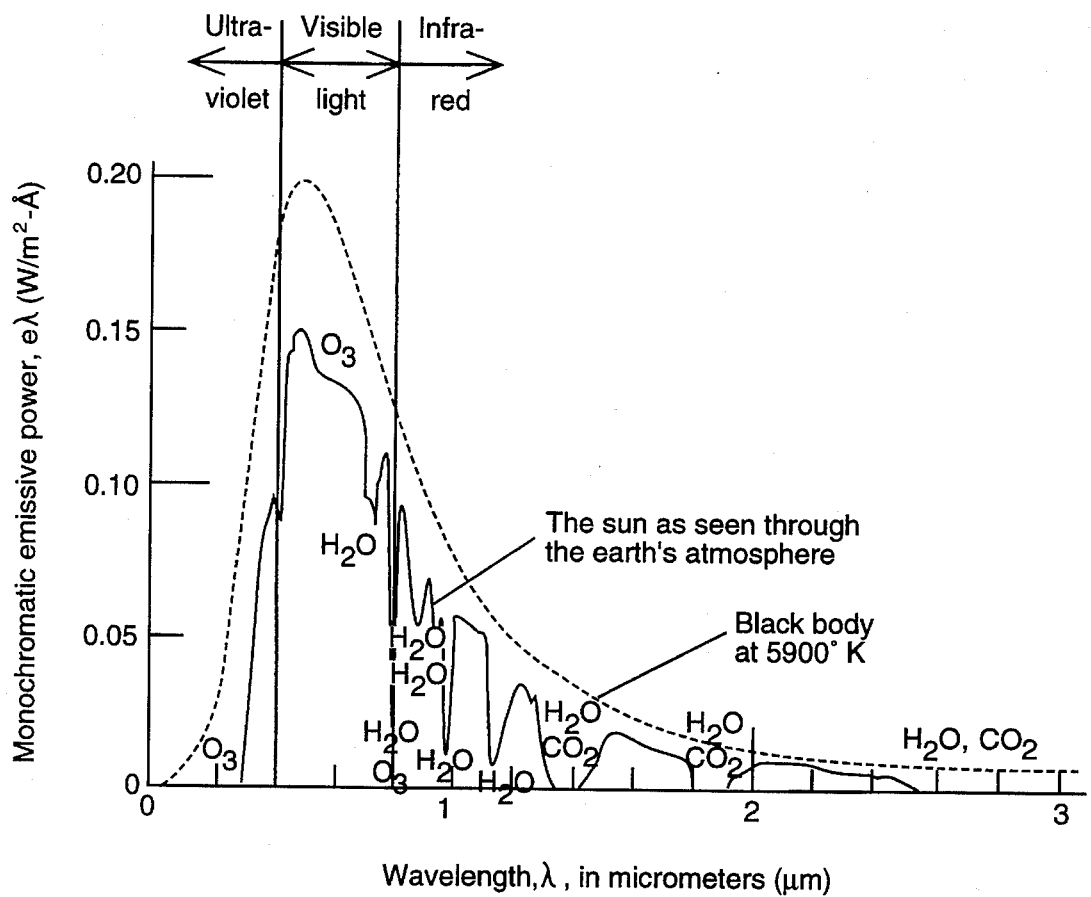
FIG. 3B is the spectral power emitted by the sun that contains radiation that is capable of activating $TiO_2$ and producing active radicals.

FIG. 3A depicts the absorption spectrum of anatase $TiO_2$ (the most suitable form of titania for use here). FIG. 3B is a spectrum of energy emitted by the sun and the range of wavelengths in the UV portion of the spectrum that is capable of activating $TiO_2$ and producing results of toxic VOC destruction. FIG. 3B shows that wavelengths less than approximately 400 nm activate $TiO_2$. The sun's spectrum contains enough UV (wavelength in the range of less than 400 nm) to activate titania.

Figure 4:
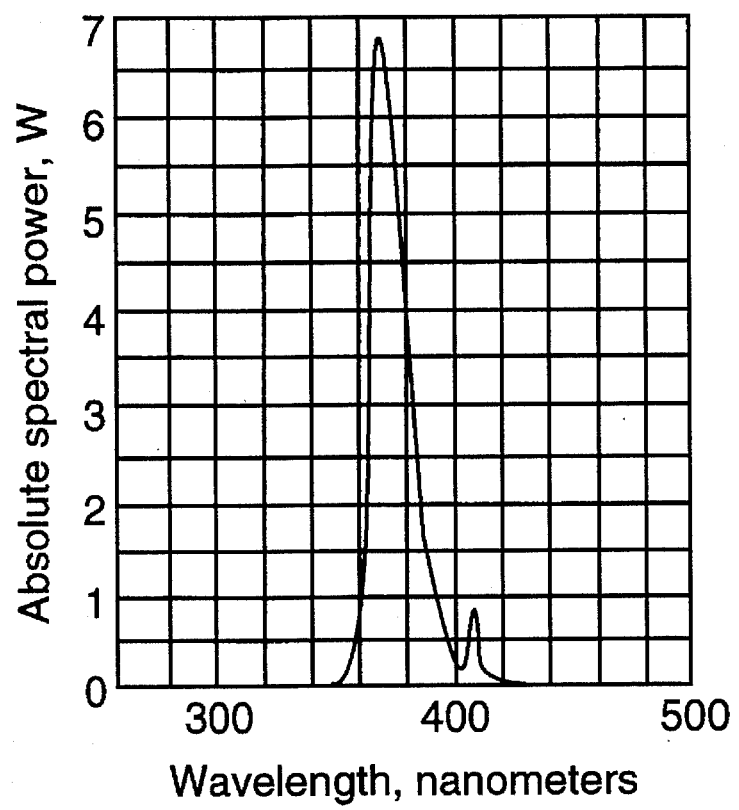
FIG. 4 is an absolute spectral power distribution of a commercial fluorescent lamp capable of activating titania and producing active species such as hydroxyl, peroxyl, and superoxide ion radicals that readily oxidize formaldehyde and other organics.

FIG. 4 displays the absolute spectral power distribution of a commercial fluorescent lamp capable of activating titania and producing chemical reactions for the destruction of toxic VOCs. Thus, artificial light is sufficient to activate titania.

Figure 5:
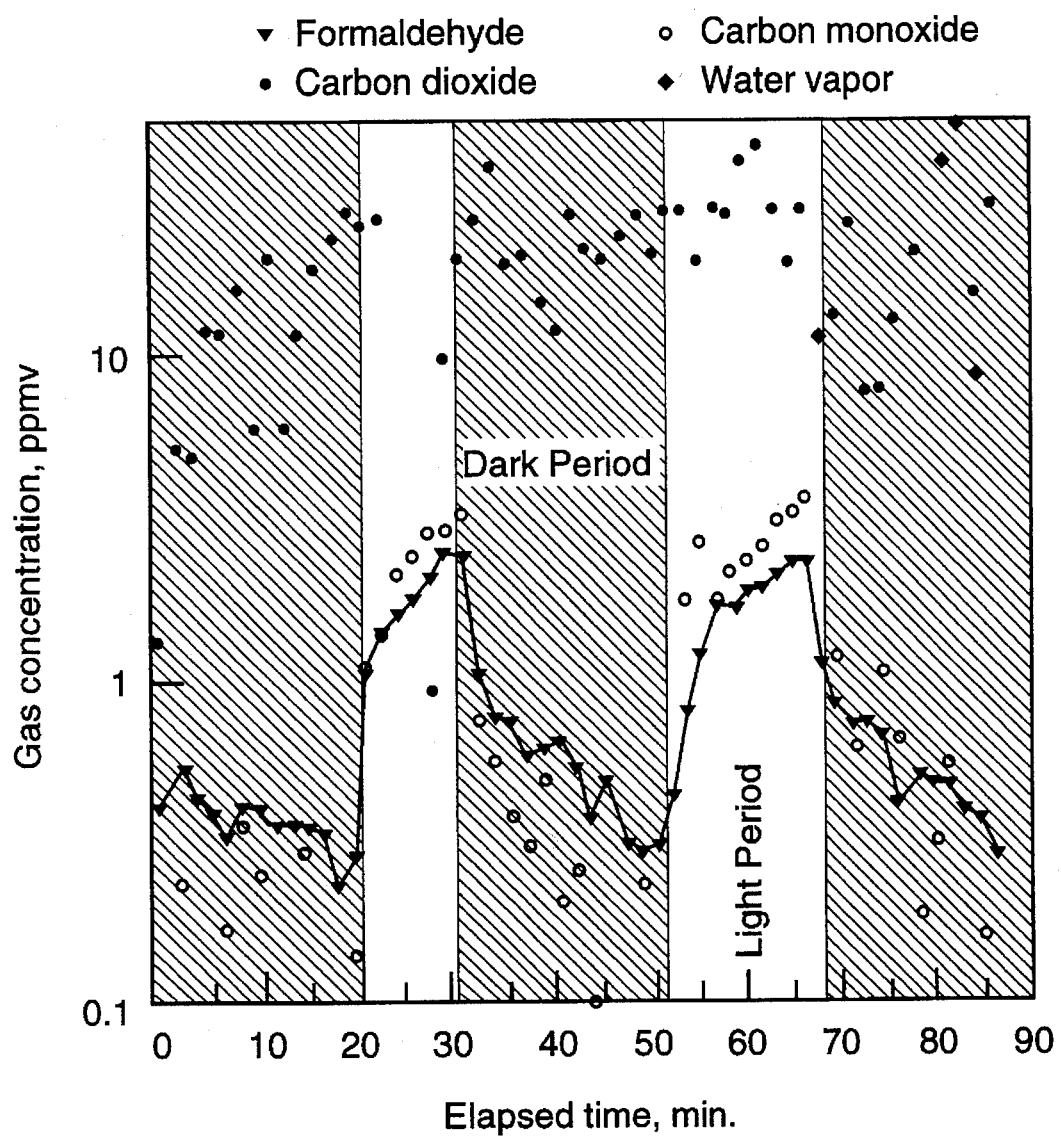
FIG. 5 depicts the gaseous concentration of formaldehyde in the ambient air emitted form a piece of virgin wood sample exposed to periods of dark and light.

FIG. 5 depicts the gaseous concentration of formaldehyde in the ambient air emitted from a piece of a wood sample exposed to periods of dark and light.

Figure 6:
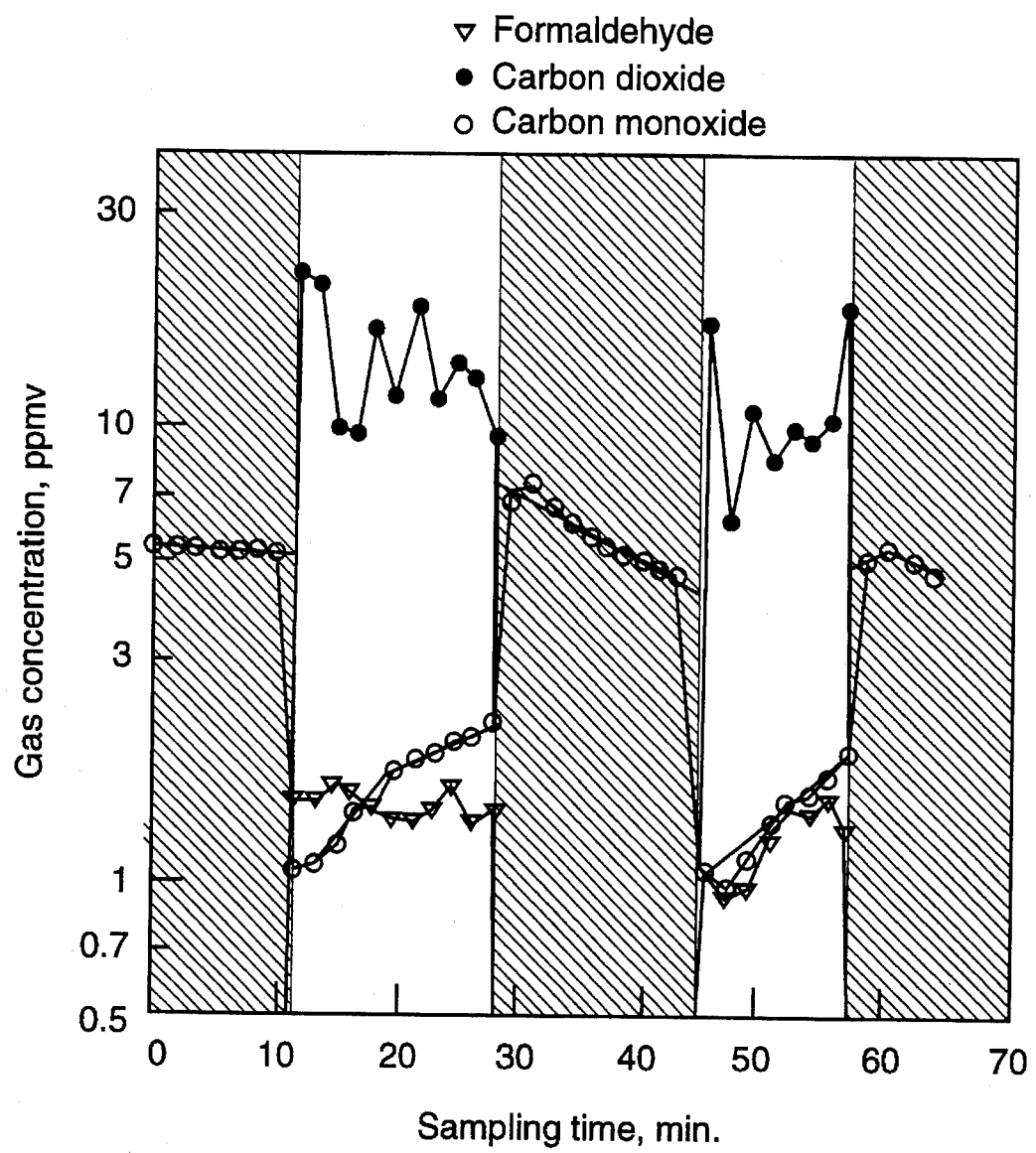
FIG. 6 is a graph of the results of the exposure of $TiO_2$ treated wood sample to periods of dark and light.

FIG. 6 is a graph of the results of the exposure of $TiO_2$ treated wood sample to periods of dark and light. It is clear that titania coating acts as a membrane capable of breaking down and destroying formaldehyde as it passes through this layer, when illuminated by light. It can be seen that when formaldehyde concentration drops, carbon dioxide concentration increases indicating that $CO_2$ is formed by action of photocatalytic oxidation of formaldehyde at the wood surface.

Figure 7A:
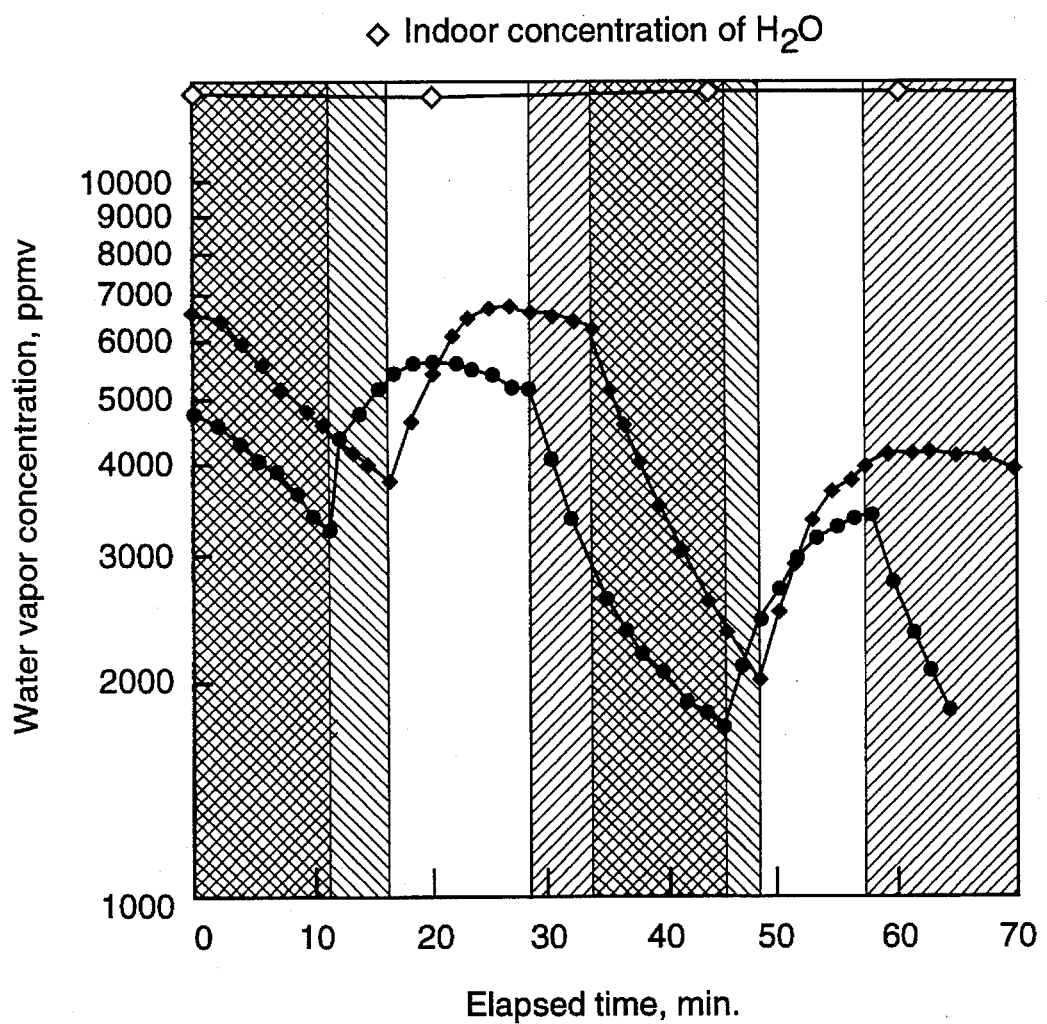
FIG. 7A is a graph of typical indoor concentration of $H_2O$ as well as the photocatalytic water vapor generated from titania-coated wood samples during periods of dark and light exposure as shown by water vapor concentration, ppmv verses elapsed time in minutes.
Figure 7B:
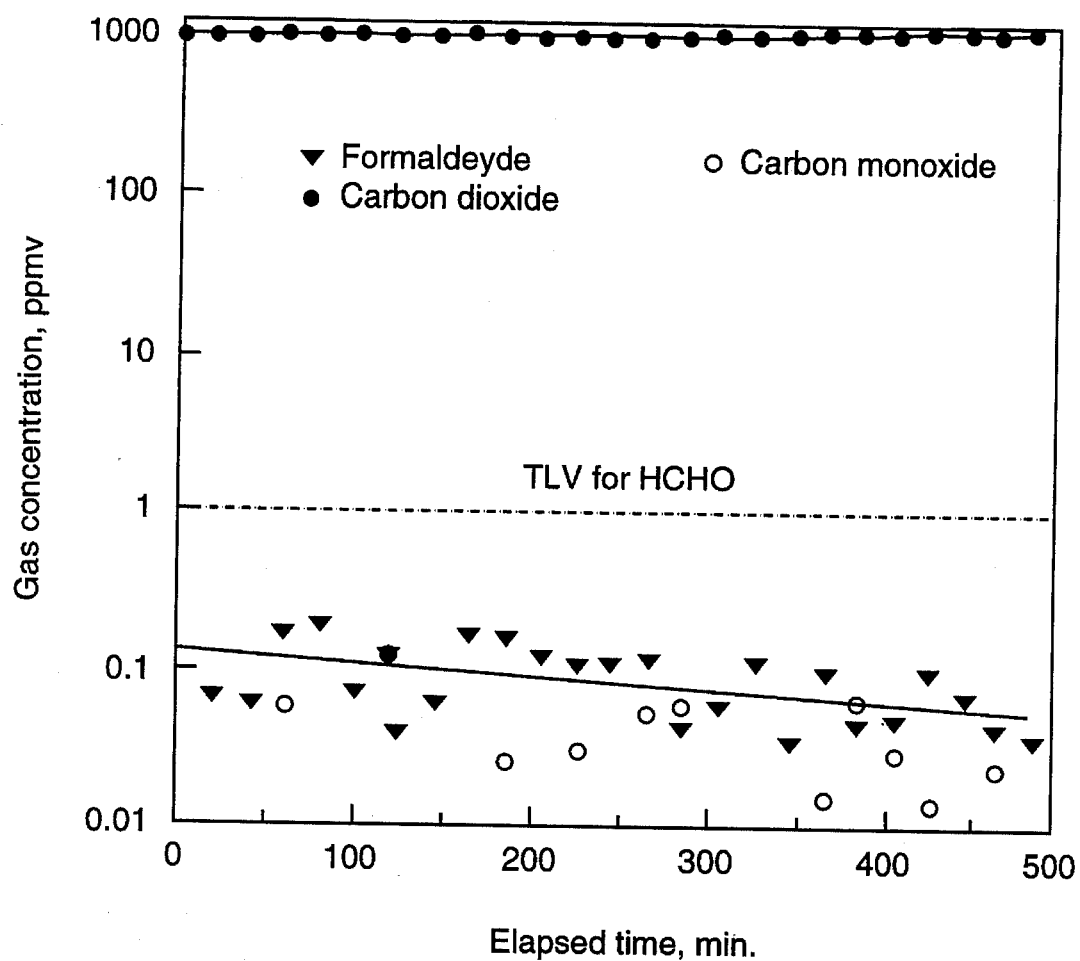
FIG. 7B is a graph of typical indoor concentration of formaldehyde, carbon monoxide and carbon dioxide as shown by gas concentration, ppmv verses elapsed time in minutes.

FIG. 7 is a graph of the indoor concentration of $H_2O$ as shown by water vapor concentration, ppmv verses elapsed time in minutes. Indoor water vapor concentrations well above 10,000 ppmv are typically present in the air that reach $TiO_2$ resulting in the formation of active oxidizing species. FIG. 7A also depicts the manner in which water is formed as a by-product of photocatalytic destruction of formaldehyde at the surface of $TiO_2$ treated wood sample. It can be seen that when $TiO_2$ treated wood is exposed to the light, $H_2O$ concentrations of the offgas increases. FIG. 7B is a graph of typical indoor concentration of formaldehyde CO and $CO_2$ as shown by gas concentration, ppmv, verses elapsed time in minutes. FIG. 7B depicts the presence of harmful toxins such as formaldehyde and CO in typical residential room air and also shows the threshold limit value (TLV) for formaldehyde.

Figure 8:
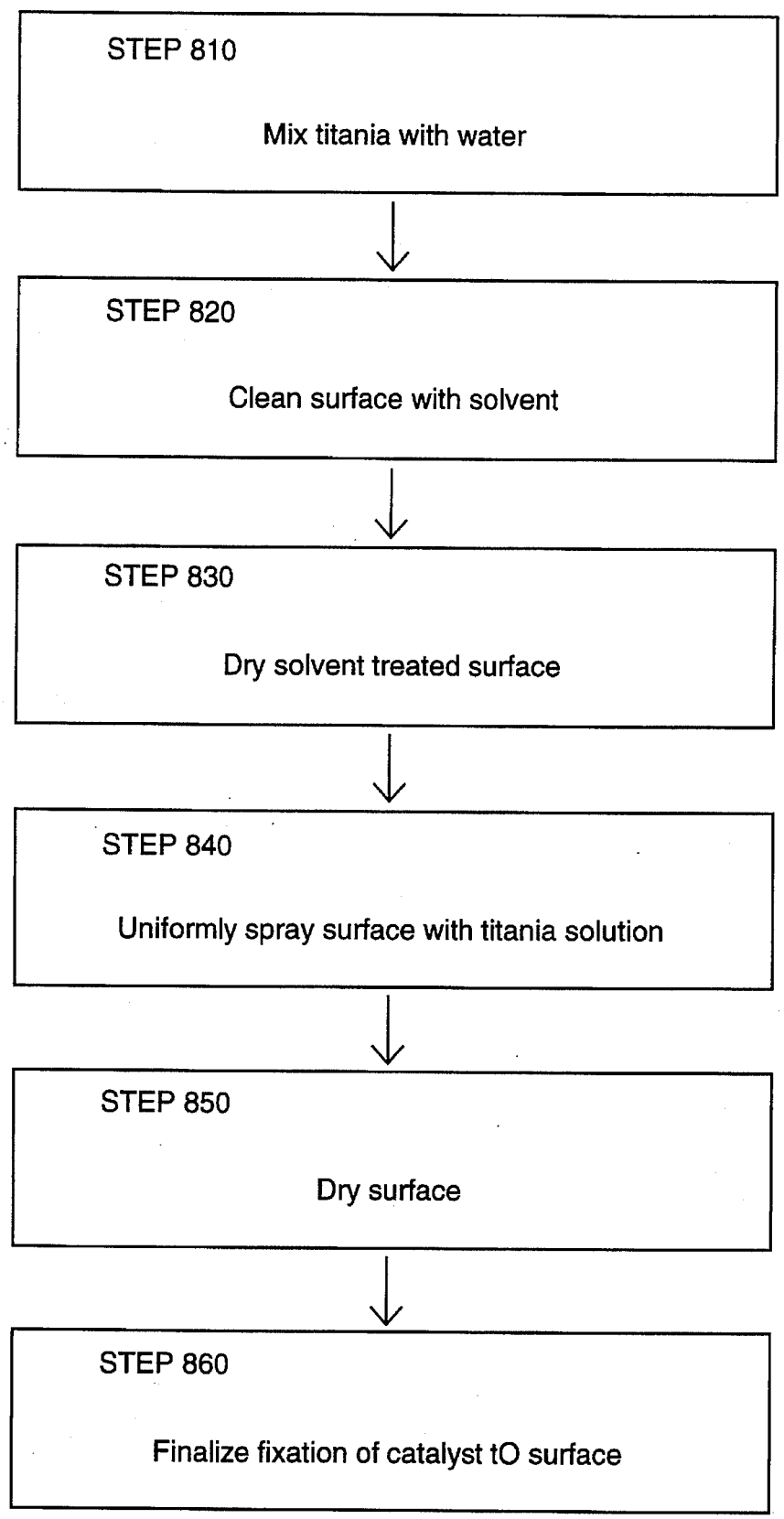
FIG. 8 shows a preferred flow chart of steps used in applying a $TiO_2$ membrane to a wood sample to achieve the destruction of formaldehyde and other harmful VOCs.

FIG. 8 shows a preferred flow chart of steps used in applying a $TiO_2$ membrane to a wood sample to achieve the destruction of toxic VOCs such as but not limited to formaldehyde. In step 810, titania such as Deguss P25™, is mixed with water to make a uniform suspension (ratio $TiO_2$ to water=1:5–10 by weight). Step 820 is to clean (i.e. degrease) the surface to which catalyst will be applied by using a suitable solvent such as acetone, ethanol and the like. Step 830 is to dry the surface at room temperature to remove solvents. Step 840 is to uniformly spray the aqueous titania suspension over the woody surface to achieve loading density of approximately 1 to 2 $g/m^2$. Alternatively, a thickness of approximately 0.6–1.2 micrometer is used for a dry condition. Step 850 is to dry the surface at approximately room temperature or an ambient temperature of approximately 25° to 30° C. Step 860 is to pass the coated surface along with an acrylic or silicone film through a press roller to finalize fixation of the catalyst to the surface. Alternatively, other membranes that are also UV transparent and permeable, and the like can be used in place of the silicone film.

Figure 9A:
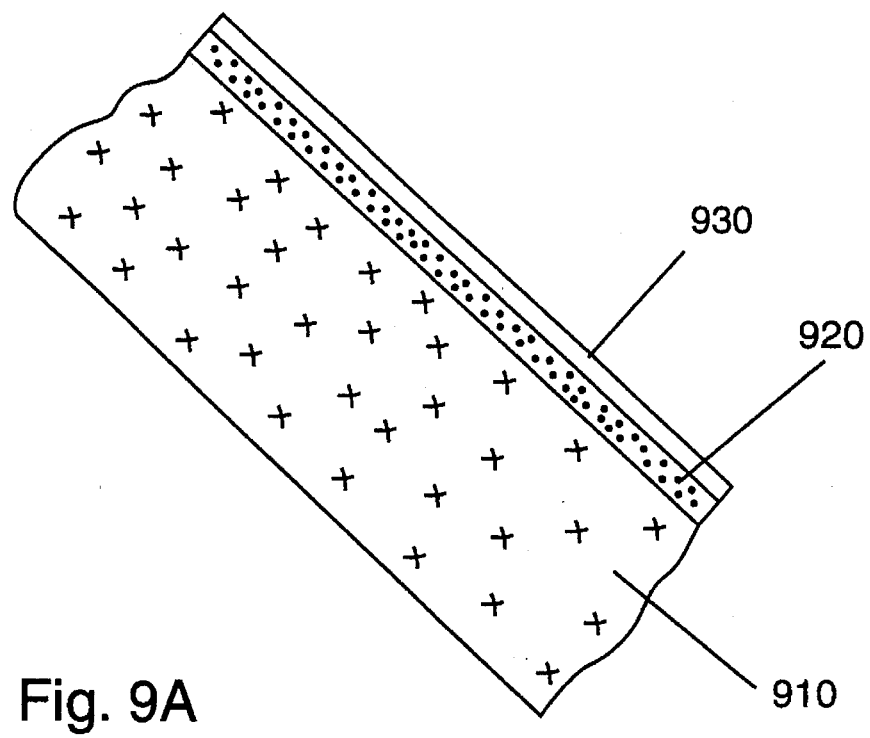
FIG. 9a shows an embodiment of an application of a $TiO_2$ membrane to residential wood paneling.

FIG. 9a shows an embodiment of an application of a $TiO_2$ membrane to residential wood paneling. FIG. 9A depicts a cross section of a wood panel that has been prepared in accordance with the teachings of the invention discussed above. Commercially manufactured piece 910 can be a siding, particle board panel, chipboard, and roof shingles that are subjected to $TiO_2$ treatment layer 920 in accordance with the teachings of FIG. 8.

Although a section of paneling wood is shown, the invention can also be applied as a surface treatment for other wood products such as casket materials. For application to a casket material, the surface treatment would further aid in destroying the formaldehyde emissions and other VOC emissions from the embalming treatments that use formaldehyde, as well as destroy the toxic VOCs from the wood itself.

Figure 9B:
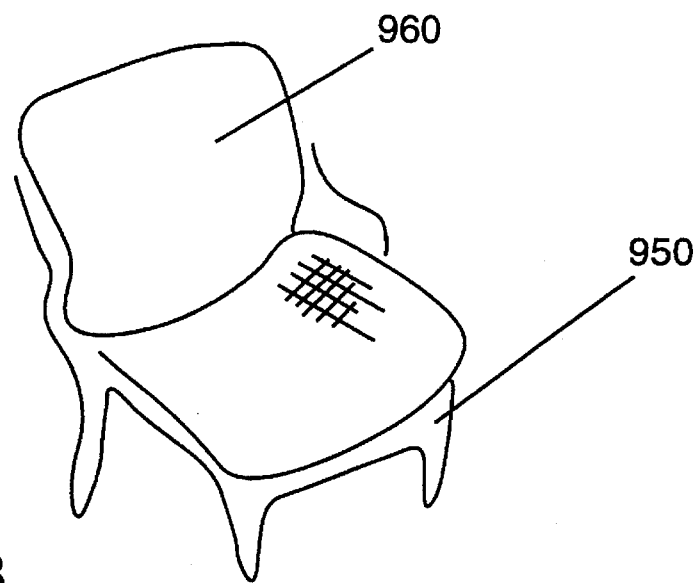
FIG. 9b shows another embodiment of an application of a $TiO_2$ membrane to a piece of wood furniture.

FIG. 9B shows another embodiment of an application of a $TiO_2$ membrane to a piece of wood furniture such as a chair. In FIG. 9B, a chair includes a wood based body 950 and a cloth/fabric material 960 that has been impregnated with the $TiO_2$ mixture discussed in relation to FIGS. 8 and 9A. Although a chair is shown, the invention would have applicability to other types of commercial and residential furniture that uses wood components such as but not limited to tables, shelves, and the like.

Figure 10A:
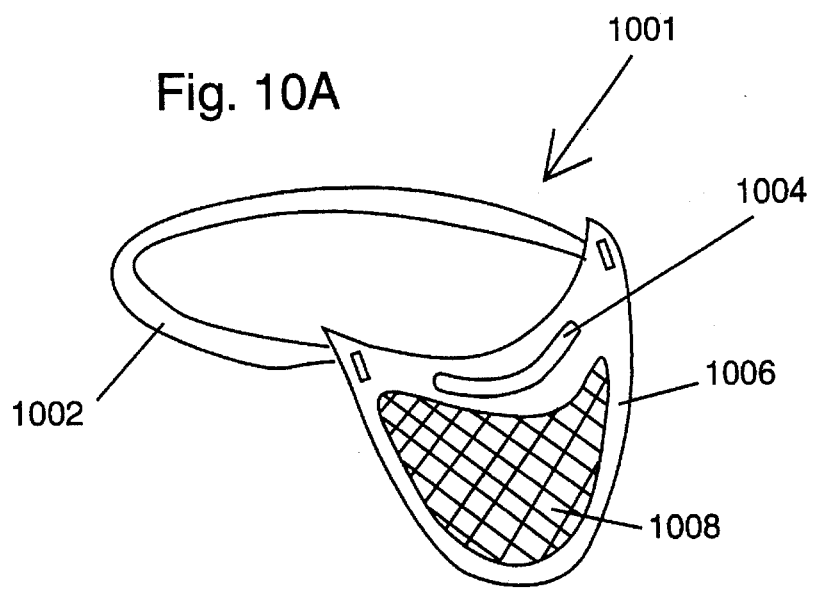
FIG. 10A through 10C shows yet a still another embodiment of an application of a $TiO_2$ membrane to a face mask for keeping out undesirable toxins.
Figure 10B:
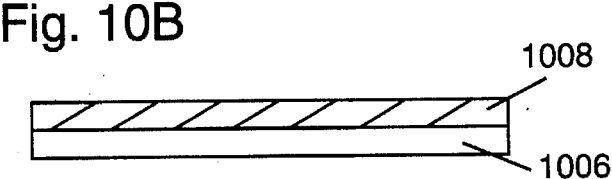
Figure 10C:
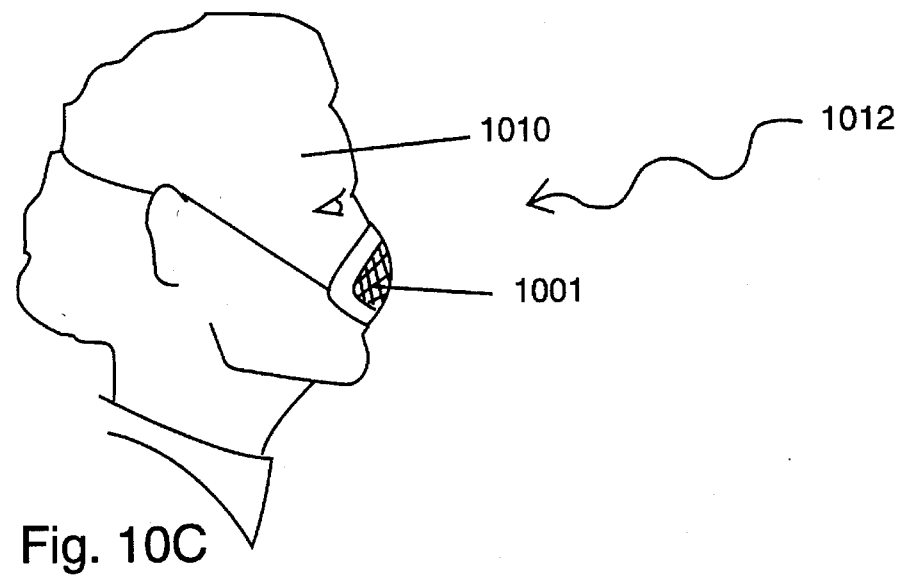

FIG. 10A–10C shows a still another embodiment of an application of a $TiO_2$ membrane to a face mask for masking out undesirable toxins. Referring to FIGS. 10A and 10B, a microns thick base support material 1006 is composed of a natural fiber such as 100% cotton. A second layer 1008 also of the same material is impregnated with $TiO_2$ using the methods previously discussed in this invention. Sandwiched layers 1006 and 1008 are adhered together by glue and the like. Sandwiched layers 1006 and 1008 are attached to ends of an elastic band 1002 such as but not limited to rubber and the like to form a mask 1001. Referring to FIG. 10C, mask 1001 is fitted over a person's face portion 1010. Light 1012 can be natural light such as the sun or alternatively artificial light such as fluorescent light. Light 1012 along with inherent moisture from the ambient air or from the face or mouth of the person 1010 activates the $TiO_2$ impregnated layer which in turn prevents toxic VOCs such as formaldehyde from reaching the mouth and lungs of a person 1010 wearing mask 1001. Alternatively, support layer 1006 can be a cellulosic fiber material such as paper and the like can be used in mask 1001. Applications of the face mask can include use by surgery room personnel, health care workers and providers, food preparers and the like.

Figure 11:
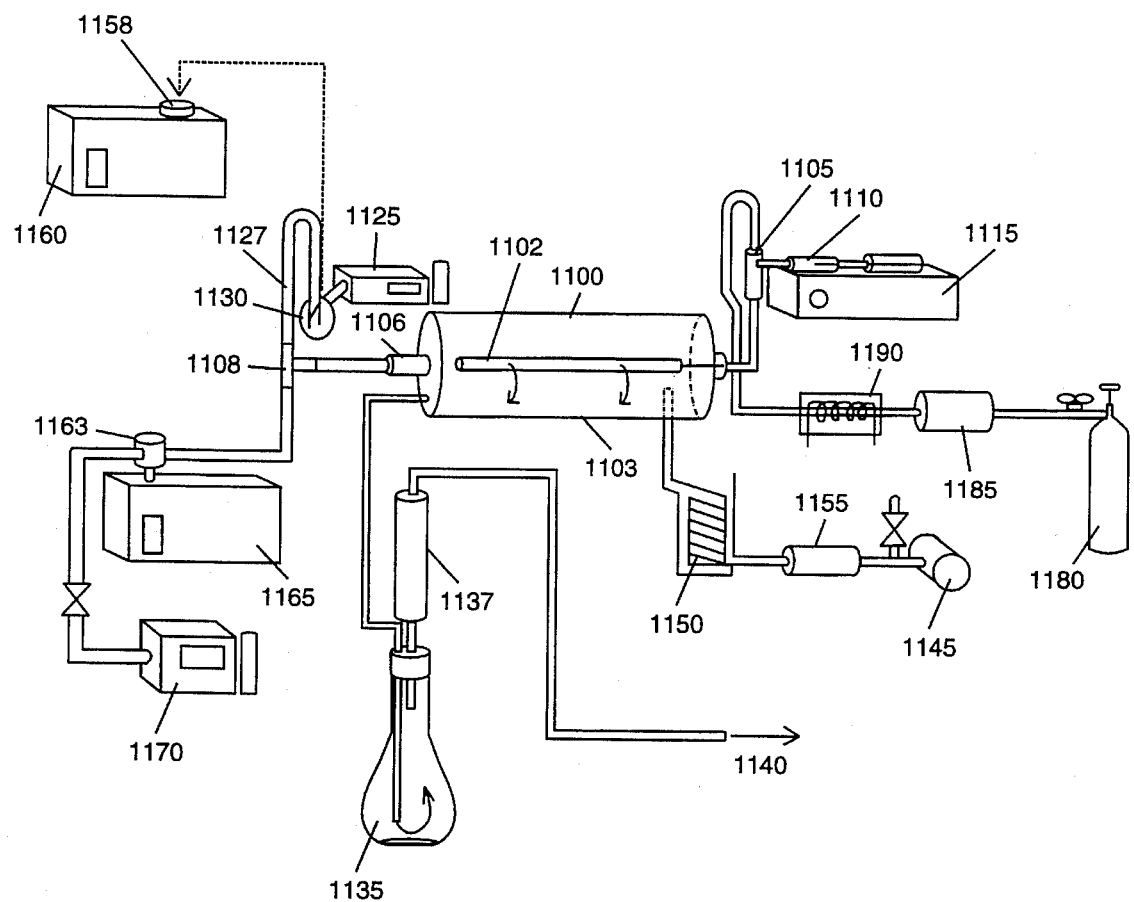
FIG. 11 illustrates a system employed for the photocatalytic oxidation of terpenic VOCs in the presence of oxygen.

FIG. 11 illustrates a continuous flow system employed for the photocatalytic oxidation of terpenic VOCs in the presence of oxygen or $H_2O$. The experimental set-up consists of three subsections that include a photo-reactor 1100, reagents preparation system 1105, 1110, 1115, and analytical devices 1160, 1165. Photo-reactor 1100 uses an annular fused silica glass flow reactor having 1025 ml volume. Photo-reactor 1100 was illuminated internally using a 54 Watt, low pressure mercury lamp 1102. The photo-reactor 1100 had a wall temperature maintained at 120 degrees C. Photo-catalyst 1103 was titanium dioxide (Deguss P-25™) deposited on the inside wall of reactor 1100 in the manner described in U.S. Pat. No. 5,246,737. The $TiO_2$ has a loading density of approximately 0.15 $mg/cm^2$. The outlet 1106 of photo-reactor 1100 was attached to an acetone absorber 1130 (for collection and analysis of monoterpenes) via tee connection 1108. A portion of the reactor output stream was pumped through an automatic injection port 1163 to gas chromatograph 1165 equipped with a flame ionization detector (GC-FID).

A mixture of the three most prevalent terpenic VOCs, (α-pinene, β-pinene, limonene) was prepared and used as a feed solution into the photo-reactor 1100. The feed solution used consisted of 50% by volume α-pinene, 30% by volume β-pinene, and 20% by volume limonene. All three reagents were Aldrich™chemicals, having a purity of 96% or better. For each experiment, approximately 5 μL of solution was injected into the heated mixing manifold 1105 at a rate of 954.2 μg/min via syringe 1110 and pump 1115, as shown in FIG. 11. The mixing chamber 1105 was packed with glass beads to provide high evaporative surface area and uniform mixing of the feed solution with input airstream from cylinder 1180. Temperatures within the mixing manifold were kept at around 140 degrees C. to allow complete evaporation of these terpenes. Input air entered through two separate heaters 1150 and 1190, each independently metered using flowmeters 1155 and 1185. The air flow was set at 326 standard mL/min, resulting in an input terpene concentration of 516 ppmv into the photoreactor 1100.

Referring to FIG. 11, terpenes were analyzed on a Varian™ gas chromatograph model 3400/Saturn II™ ion trap mass spectrometric (GC-MS) system 1160, equipped with a 15 m×0.243 mm J&W™, 1 μm stationary phase DB-1, glass capillary column.

Figure 12:
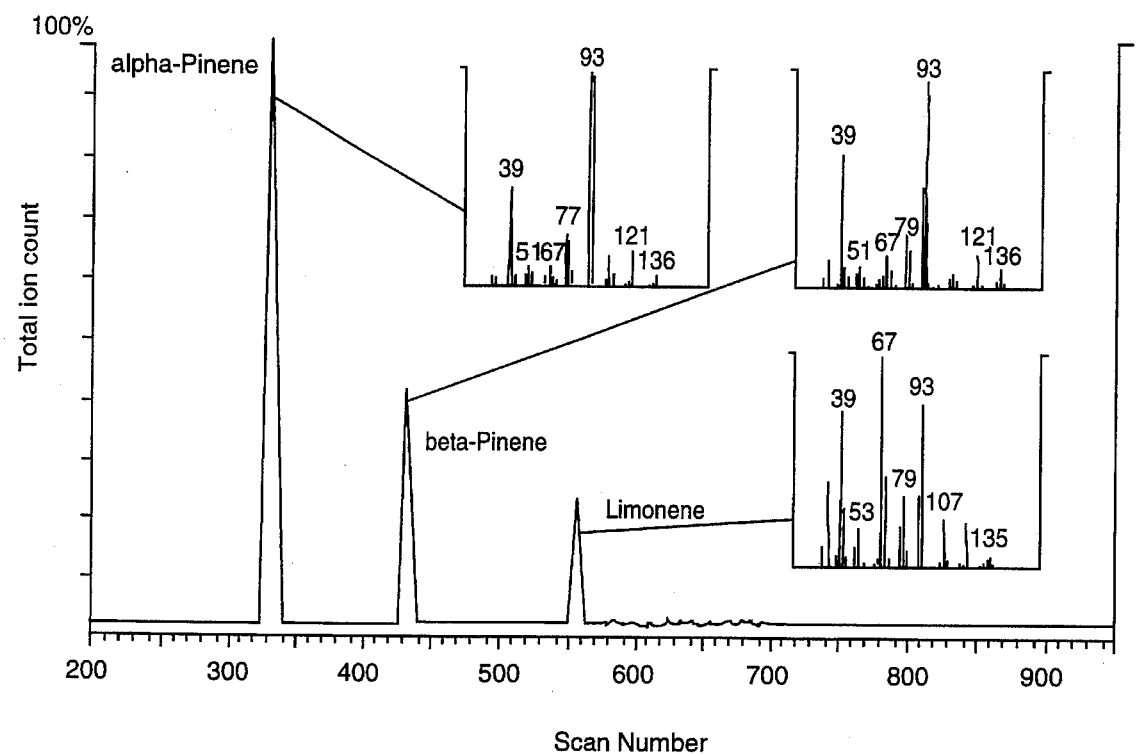
FIG. 12 shows a total ion chromatogram of different types of terpenes.

FIG. 12 depicts the total ion chromatogram (TIC) of the feed solution. FIG. 12 shows the complete separation and analysis of α-pinene, β-pinene and limonene, was possible with great accuracy. FIG. 12 also depicts the manner in which samples of reactor effluent for GC-MS analysis were obtained. This was done by passing reactor exit gas 1127 through the trap 1130 that contained 2.3 ml of acetone, for a period of three minutes. Subsequently, 0.1 μL of this solution was injected onto the GC-MS column at 1158 for the analysis of terpenes. All the light gases such as carbon monoxide (CO), carbon dioxide ($CO_2$) and methane ($CH_4$) as well as the volatile compounds such as acetaldehyde ($CH_3CHO$), acetone (DMK) and others were analyzed using a packed column gas chromatograph (GC) 1165 equipped with a flame ionization detector (FID). As FIG. 11 indicates, a portion of the reactor effluent passes through the GC sample loop via the automatic gas sampling valve 1163 and vacuum pump 1170.

In this example, we demonstrate the effectiveness of the UV-excited titania for total transformation of hazardous compounds of terpenic nature, more specifically α-pinene, β-pinene and limonene. This was done by passing a stream of air contaminated with 516 ppmv of 50% pinene, 30% β-pinene and 20% limonene (all by volume) through the photo-reactor 1100 in a manner described above.

Figure 13:
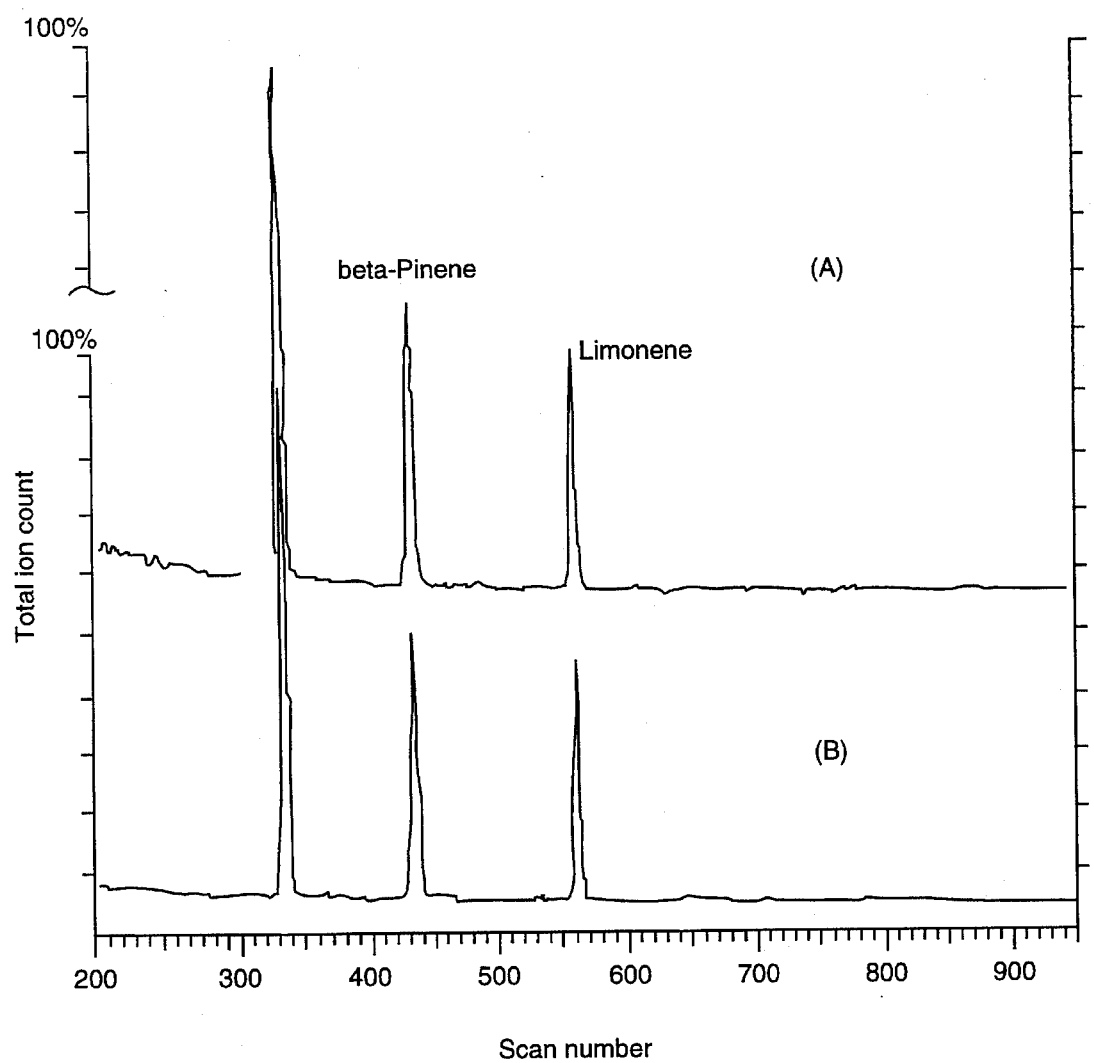
FIG. 13 shows a total ion chromatogram of a dark reactor effluent.
Figure 14:
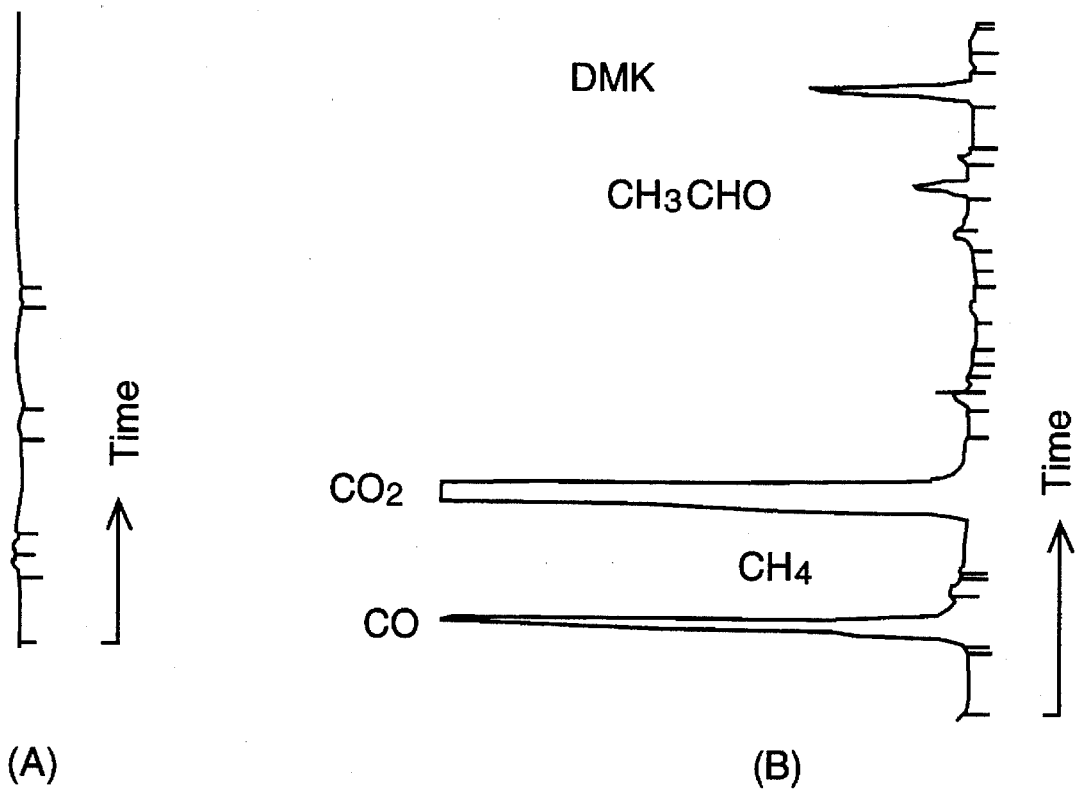
FIG. 14A shows the GC-FID chromatogram of a dark reactor effluent over time.
FIG. 14B shows the GC-FID chromatogram of a light reactor effluent over time.
Figure 15:
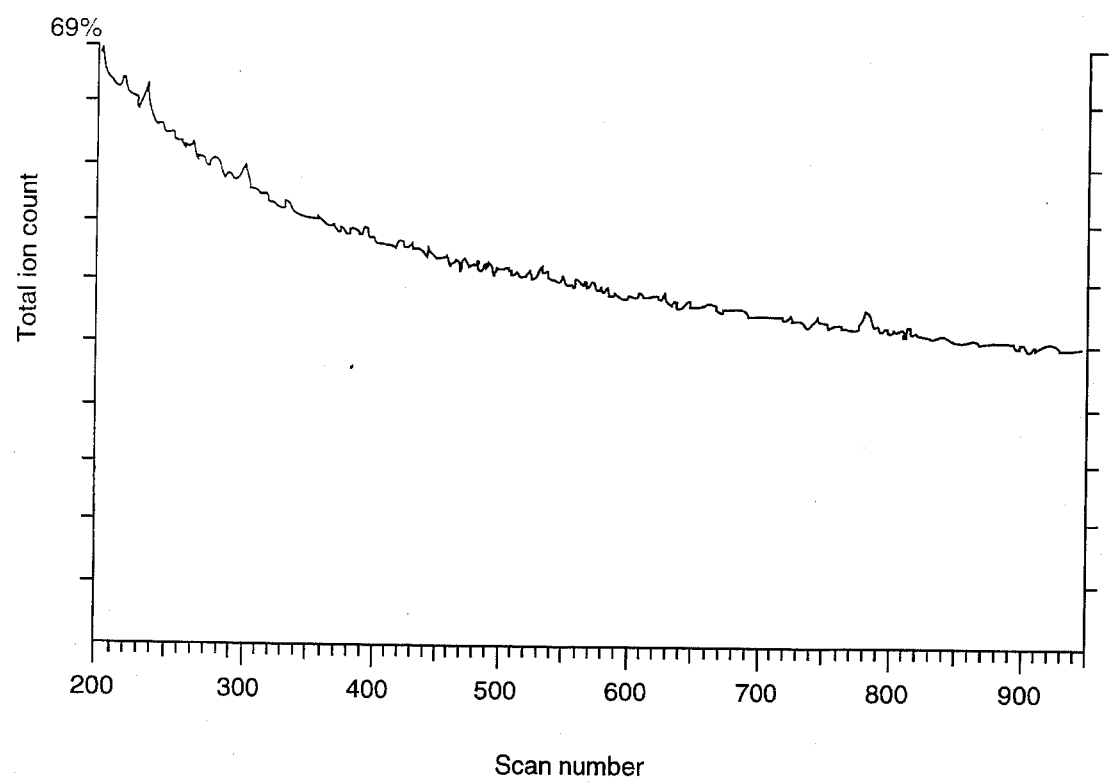
FIG. 15 shows the Total ion chromatogram of terpenes shown in FIGS. 14A and 14B exposed to UV-excited $TiO_2$.

Total ion chromatogram (TIC) of the mixture introduced into the photo-reactor 1100 is depicted in FIG. 12. Under a dark condition where no UV radiation is present, reactor effluent analysis depicts the presence of all three monoterpenes as shown in FIG. 13A. Comparing FIGS. 12 and 13A, it is clear that no terpenes conversion occurs in the presence of $TiO_2$ in the dark. This conclusion is supported by the GC-FID analysis of the reactor effluent depicted in FIG. 14A, which shows no by-product peaks. However, after UV lamp 1102 is turned on, no traces of terpenes could be detected in the reactor effluent, shown in FIG. 14B and FIG. 15, depicting by-product peaks of which the prominent one belongs to the deep oxidation product $CO_2$. It can be seen that the titania-catalyzed photoproducts of terpenes oxidation are mainly carbon dioxide and water. In order to verify that terpenes do indeed photo-oxidize in the presence of $TiO_2$ catalyst, the UV lamp was switched off and the reactor effluent was then analyzed for terpenes. Results are depicted in FIG. 13B, indicating the presence of α-pinene, β-pinene, and limonene, in the exit air. Therefore, both titania and light are needed for the destruction of terpenic compounds.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method of destroying formaldehyde leakage from a wood layer of wood paneling and wood shingles comprising the steps of:

preparing a mixture of $TiO_2$ with $H_2O$; and applying a layer of the prepared mixture to one side of a wood support surface, the wood support surface chosen from at least one of a wood paneling and a wood roof shingle;

applying light having a wavelength of up to approximately 400 nm to the wood surface, wherein light striking the wood surface having the prepared $TiO_2$ mixture layer causes a photocatalytic effect destroying formaldehyde emissions from the wood surface.

2. The method of destroying formaldehyde leakage of claim 1, wherein the step of applying further includes:

depositing approximately 2 g of $TiO_2$ per square meter on the wood surface.

3. The method of destroying formaldehyde leakage of claim 1, wherein the step of applying further includes:

depositing a $TiO_2$ film thickness of approximately 1 to 4.5 microns.

4. A method of destroying harmful toxic volatile organic compounds (VOCs) including formaldehyde from a wood layer comprising the steps of:

preparing a mixture of $TiO_2$ and $H_2O$;

applying the mixture of $TiO_2$ to one surface of the wood layer at a density of up to 2 grams of $TiO_2$ per square meter and at a thickness of approximately 1 to 4.5 microns to form a treated surface; and applying light to the treated surface, wherein the light striking the treated surface causes a photocatalytic effect destroying VOC emissions including formaldehyde from the wood surface.

5. The method of destroying harmful toxic VOCs of claim 4, wherein the VOCs include:

terpenes.

6. The method of destroying harmful toxic VOCs of claim 5, wherein the terpenes further include α-pinene, β-pinene, limonene, camphene, and fenchone.

7. The method of destroying harmful toxic VOCs of claim 4, wherein the light further includes wavelengths of:

up to approximately 400 nm.

8. The method of destroying harmful toxic VOCs of claim 4, wherein the wood includes:

wood paneling.

9. The method of destroying harmful toxic VOCs of claim 4, wherein the wood includes:

wood furniture.

10. The method of destroying harmful toxic VOCs of claim 4, wherein the wood includes:

a wood casket.

11. The method of destroying harmful toxic VOCs of claim 4, wherein the wood includes:

a roof shingle.

12. A method of destroying formaldehyde leakage from a comprising the steps of:

preparing a mixture of $TiO_2$ and $H_2O$; and applying a layer of the prepared mixture to one side of a wood support surface, the wood support surface chosen from at least one of wood furniture and a wood casket;

applying light having a wavelength of up to approximately 400 nm to the wood surface, wherein light striking the wood surface having the prepared $TiO_2$ mixture layer causes a photocatalytic effect destroying formaldehyde emissions from the wood surface.

\* \* \* \* \*